US008985903B1

(12) United States Patent
Frith

(10) Patent No.: US 8,985,903 B1
(45) Date of Patent: Mar. 24, 2015

(54) BELL-HOLE PIPELINE PROTECTION SYSTEM

(71) Applicant: Trent W. Frith, Burgettstown, PA (US)

(72) Inventor: Trent W. Frith, Burgettstown, PA (US)

( * ) Notice: Subject to any disclaimer, the term of this patent is extended or adjusted under 35 U.S.C. 154(b) by 0 days.

(21) Appl. No.: 14/294,854

(22) Filed: Jun. 3, 2014

Related U.S. Application Data

(60) Provisional application No. 61/937,143, filed on Feb. 7, 2014.

(51) Int. Cl.
*F16L 1/11* (2006.01)
*F16L 57/00* (2006.01)

(52) U.S. Cl.
CPC .. *F16L 1/11* (2013.01); *F16L 57/00* (2013.01)
USPC ........................................ 405/157; 405/184.5

(58) Field of Classification Search
CPC .................................. F16L 1/11; F16L 57/00
USPC .............................................. 405/157, 184.5
See application file for complete search history.

(56) References Cited

U.S. PATENT DOCUMENTS

| 2,308,316 | A | | 1/1943 | Smith et al. | |
| 4,955,756 | A | | 9/1990 | Klamar | |
| 5,120,433 | A | | 6/1992 | Osadchuk | |
| 5,639,364 | A | * | 6/1997 | Houck et al. | 405/50 |
| 5,833,019 | A | | 11/1998 | Gynz-Rekowski | |
| 5,846,026 | A | | 12/1998 | Gilbert et al. | |
| 5,938,373 | A | | 8/1999 | Scudder | |
| 6,648,549 | B1 | * | 11/2003 | Urriola | 405/53 |
| 6,779,946 | B1 | * | 8/2004 | Urriola et al. | 405/43 |
| 7,070,360 | B2 | * | 7/2006 | Ellingsen | 405/157 |
| 7,591,610 | B2 | * | 9/2009 | Krichten et al. | 405/50 |
| 7,621,695 | B2 | * | 11/2009 | Smith et al. | 405/53 |
| 7,677,835 | B2 | * | 3/2010 | Oscar | 405/45 |
| 7,712,997 | B2 | * | 5/2010 | Roelfsema | 405/45 |
| 7,886,463 | B2 | | 2/2011 | Greenberg et al. | |
| 8,753,037 | B2 | * | 6/2014 | Hewing et al. | 405/50 |
| 2009/0279953 | A1 | * | 11/2009 | Allard et al. | 405/45 |
| 2010/0021236 | A1 | * | 1/2010 | Kreikemeier | 405/55 |

FOREIGN PATENT DOCUMENTS

| EP | 0626483 | A2 | 11/1994 |
| EP | 1770323 | A2 | 9/2006 |

* cited by examiner

*Primary Examiner* — Frederick L Lagman
(74) *Attorney, Agent, or Firm* — Robert C. Montgomery; Montgomery Patent & Design

(57) ABSTRACT

An underground service protection system made from two main sections, a first frame having a bottom panel with hinged side and end panels and a second frame having side and end panels. The end panels retain inserted slides having half apertures. The half apertures surround a pipe or other structure being protected while the first frame and second frame form a protective cage. A standpipe and a back-fill gauge extend upward from the protection system. The hinged ends and sides enable the first frame to be installed with reduced material removable. The first frame and the second frame are aligned and held together using stakes on the first frame and pockets on the second frame. Tie wraps are used to hold the sides and the stakes and pockets together.

20 Claims, 8 Drawing Sheets

BELL-HOLE PIPELINE PROTECTION SYSTEM

RELATED APPLICATIONS

This application claims the benefit of U.S. Provisional Application No. 61/937,143, which was filed Feb. 7, 2014.

FIELD OF THE INVENTION

The present invention relates generally to subterranean pipelines. More specifically, the present invention relates to improvements to bell-hole barriers which protect subterranean pipelines.

BACKGROUND OF THE INVENTION

There are literally thousands of miles of underground gas pipelines that transport fuel from sources into refineries and then out to businesses and homes. Such gas pipelines require access for servicing and maintenance. In addition, gas pipelines also require physical protection against damage. This is especially true where they pass underneath roads and highways since the weight of heavy trucks can damage them.

Gas pipeline construction is therefore intimately involved in both providing access to and protection of gas pipelines. To that end gas pipeline construction makes use of various formworks and concrete structures. In practice those structures are difficult to handle, time consuming to install, and costly to implement. Additionally, their concrete must be dealt with should the gas pipeline need to be removed or replaced.

In view of the costs, time and difficult of implementing both access into and protection of underground gas pipelines there exists a need for new protection devices that can provide both needed access into and protection of underground gas pipelines. Preferably such new protections devices would reduce or eliminate some of the disadvantages described above. Beneficially, such protection devices could also be used with other types of pipelines such as oil pipelines and with other services such as water, sewer, and electrical.

SUMMARY OF THE INVENTION

The inventor recognized the aforementioned problems and developed a new, useful, and unobvious protection device that provides both access into and protection of underground gas pipelines and which can be used with other types of pipelines and with other services.

An underground service protection system that is in accord with the present invention includes a first frame having a bottom panel, a first side panel attached to the bottom panel by a first hinge, a second side panel attached to the bottom panel by a second hinge, a first end panel attached to the bottom panel by a third hinge, and a second end panel attached to the bottom panel by a fourth hinge. The first end panel includes a first set of insert slides and the second end panel includes a second set of insert slides. In addition, the protection system includes a second frame having a top panel, a third side panel, a fourth side panel, a third end panel, and a fourth end panel. The third end panel includes a third set of insert slides and the fourth end panel includes a fourth set of insert slides. A first insert having a first half aperture is inserted into the first set of insert slides and a second insert having a second half aperture inserted into the second set of insert slides. A third insert having a third half aperture inserted into the third set of insert slides and a fourth insert having a fourth half aperture inserted into the fourth set of insert slides. The first frame and the second frame are aligned such that the first half aperture and the third half aperture form a first aperture and the second half aperture and the fourth half aperture form a second aperture. The first aperture and the second aperture can be used to fit over a pipe.

In practice the underground service protection system also includes a first collar attached to the top panel and a standpipe that extends upward from the first collar. In that case the there may be a pipe cover over the standpipe and a lock system for locking the pipe cover to the standpipe. Preferably the standpipe extends above ground and includes indicia with information regarding the underground service protection system. The standpipe may be color coded to provide information regarding the underground service protection system.

That underground service protection may also include a second collar that is attached to the top panel and a backfill gauge that extends upward from the second collar. That backfill gauge can be used to indicate how much backfill material is needed to cover the underground service protection system.

In practice the underground service protection system can include a hinge pin that passes through the bottom panel. The first frame may include stakes, the second frame may include pockets, and the stakes can fit into the pockets when the first frame and the second frame are aligned. In that case the stakes and pockets can be secured together by tie wraps. Tie wraps can also be used to secure the first side panel to the second side panel. Beneficially, the first frame and the second frame form a protective cage around a pipe. In addition the first panel may be comprised of a structural framework of square cross-sectional elements that are interconnected by a series of open lattice panels. The second frame can be a rigid structure and may be made using an injection molding process.

The present invention also provides for a protection system having a first frame with a bottom panel, a first side panel that is attached to the bottom panel by a first hinge, a second side panel that is attached to the bottom panel by a second hinge, a first end panel that is attached to the bottom panel by a third hinge, and a second end panel that is attached to the bottom panel by a fourth hinge. The first end panel includes a first set of insert slides and the second end panel includes a second set of insert slides. That protection system further includes a top panel, a third side panel, a fourth side panel, a third end panel, and a fourth end panel. The third end panel includes a third set of insert slides and the fourth end panel includes a fourth set of insert slides. A first insert having a first half aperture is inserted into the first set of insert slides; a second insert having a second half aperture is inserted into the second set of insert slides, a third insert having a third half aperture is inserted into the third set of insert slides; and a fourth insert having a fourth half aperture is inserted into the fourth set of insert slides. When the first frame and the second frame are aligned the first half aperture and the third half aperture form a first aperture and the second half aperture and the fourth half aperture form a second aperture. In addition, a first collar is attached to the top panel, a second collar is attached to the top panel, a third collar is attached to the bottom panel, and a fourth collar is attached to the bottom panel.

In practice the protection system also includes a standpipe that extends upward from the first collar and a pipe cover over the standpipe. The protection system may include a backfill gauge extending from the second collar. Beneficially, the first frame includes stakes, the second frame includes pockets, and the stakes fit into the pockets when the first frame and the second frame are aligned.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
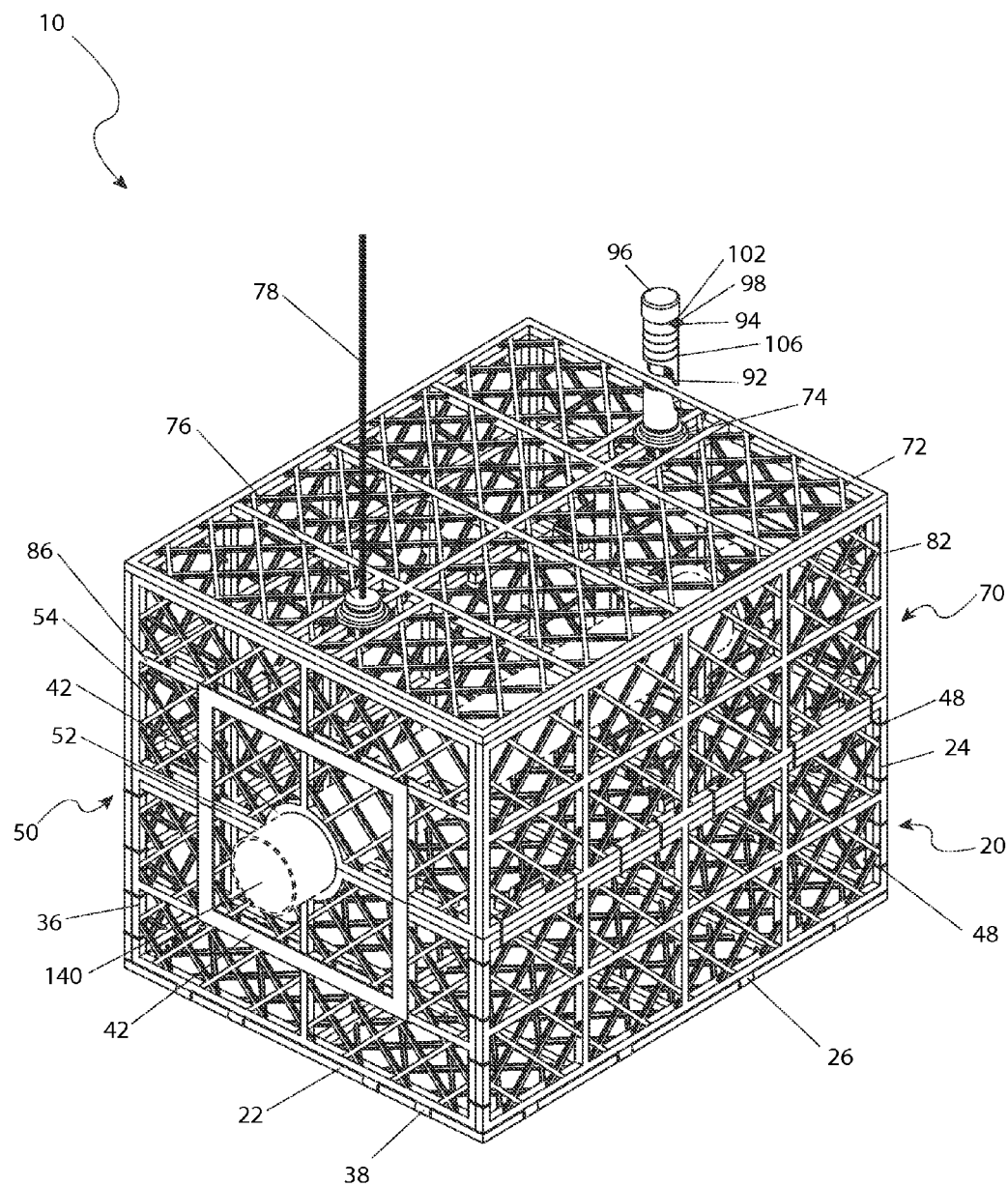
FIG. 1 is an isolated, isometric view of a pipeline protection system 10 that in accord with the preferred embodiment of the present invention.

DESCRIPTIVE KEY 10 pipeline protection system
20 first frame
22 bottom panel
24 first side panel
26 first side hinge
28 hinge pin
32 second side panel
34 second side hinge
36 first end panel
38 first end hinge
42 insert slide
44 stake
48 tie wrap
50 pipe insert
52 insert frame
54 pipe aperture
58 hinge knuckle
62 second end panel
64 second end hinge
66 pocket
70 second frame
72 top panel
74 collar
76 collar plug
78 backfill gauge
82 third side panel
84 fourth side panel
86 third end panel
88 fourth end panel
92 stand pipe
94 pipe tab
96 pipe cover
98 cover tab
102 tab aperture
106 indicia
112 alternate bottom panel
140 pipeline

DETAILED DESCRIPTION OF THE PREFERRED EMBODIMENT

Figure 6:
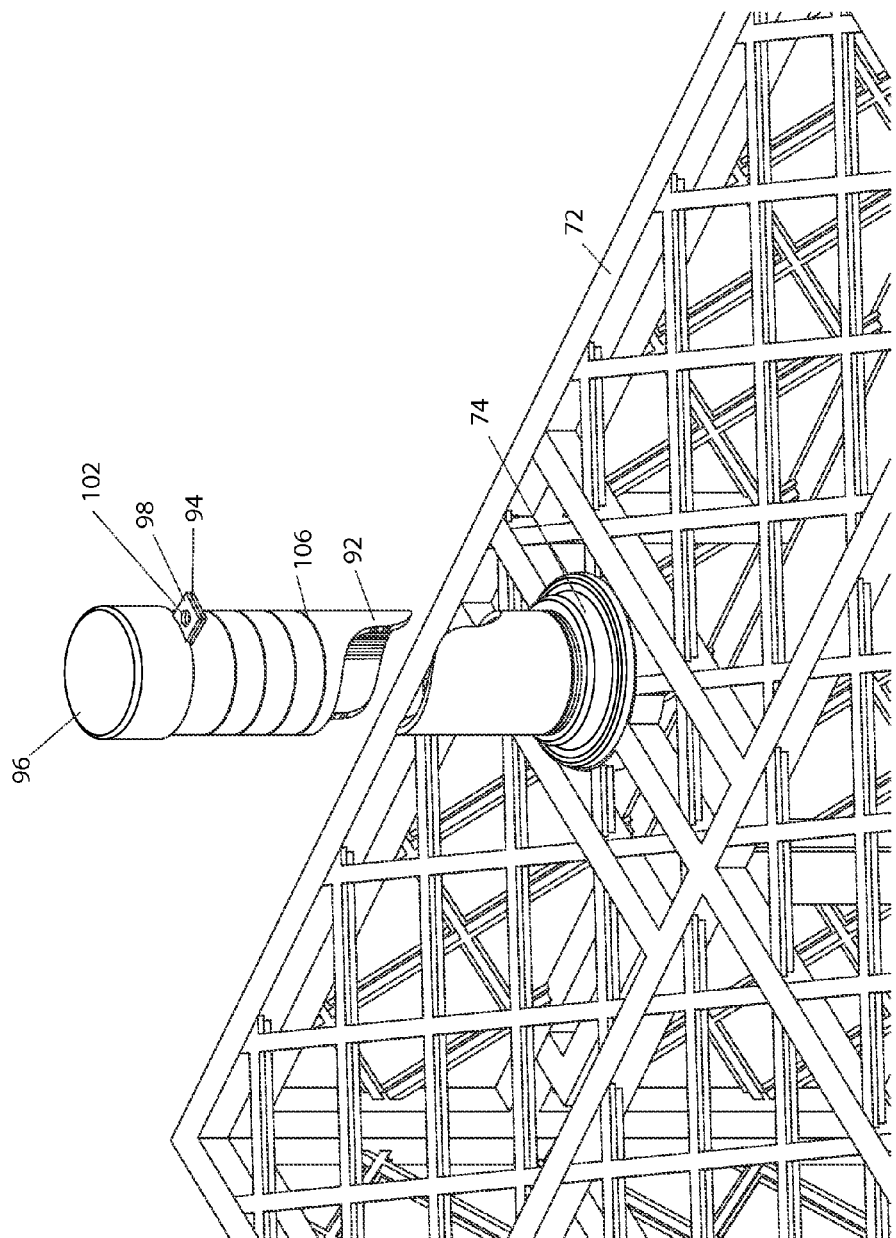
FIG. 6 illustrates a stand pipe 92 used in the pipeline protection system 10 shown in FIGS. 1 and 2.
Figure 7:
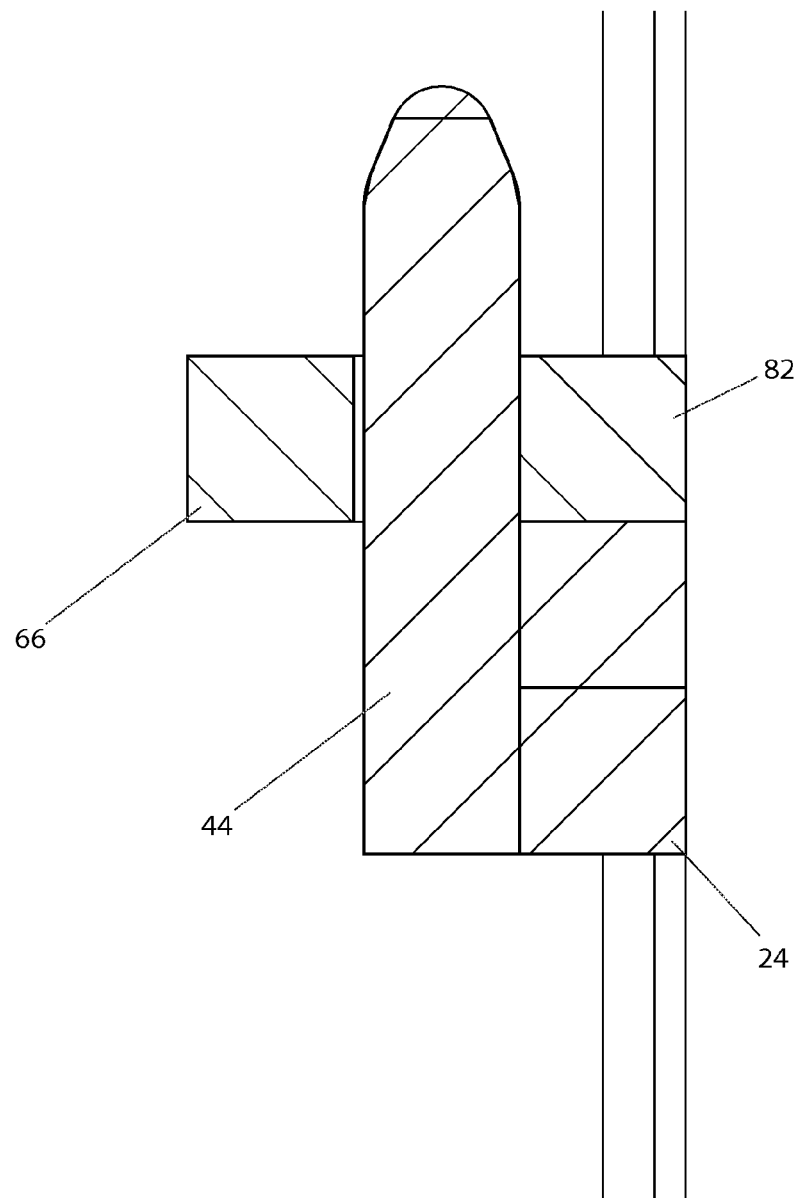
FIG. 7 is a section view along line A-A of FIG. 5.
Figure 8:
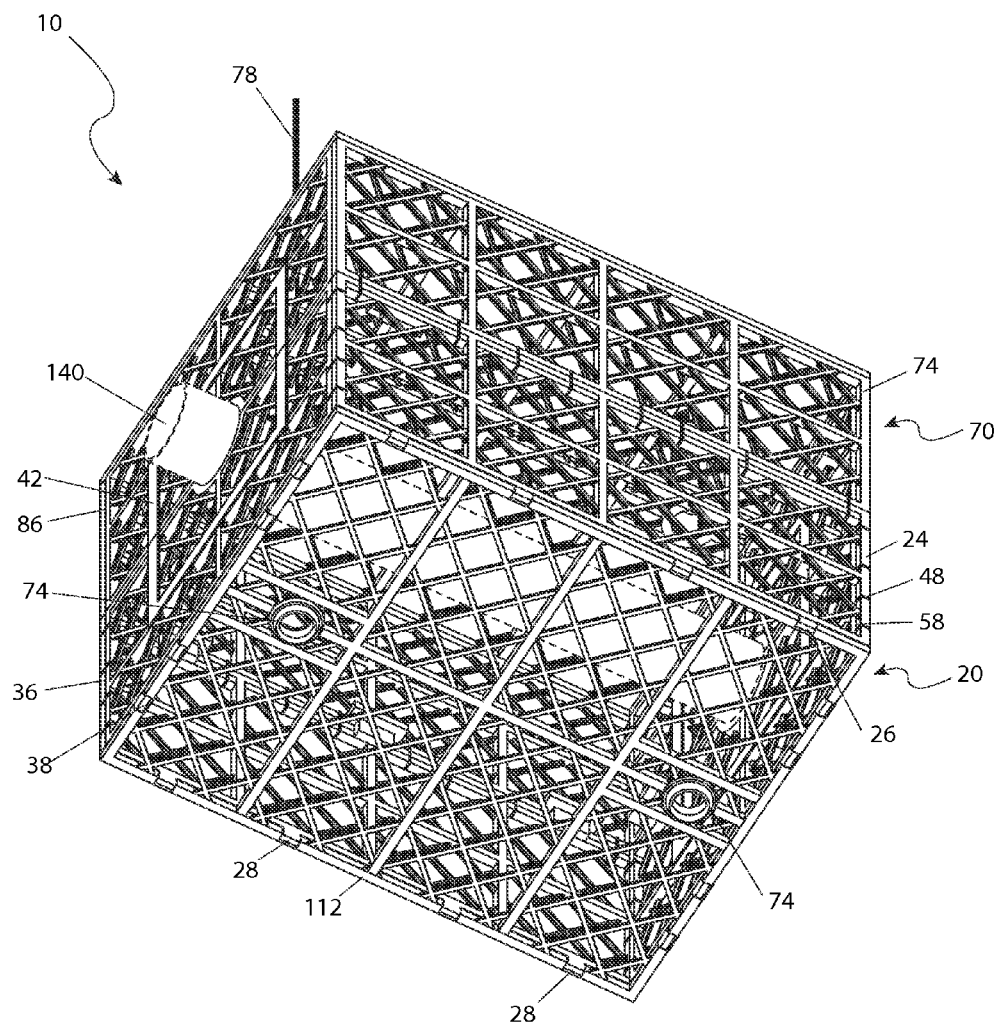
FIG. 8 is an isolated isometric view of the pipeline protection system 10 having an alternative bottom panel 112.

The preferred embodiment of the present invention is depicted within FIGS. 1 through 7 and in FIG. 8 (which shows an embodiment having a different bottom panel 112). However, the invention is not limited to what is specifically illustrated and described. A person skilled in the art will appreciate that many other embodiments of the invention are possible without deviating from the basic concept of the invention. Any such work around also falls with the scope of this invention.

The terms "a" and "an" herein do not denote a limitation of quantity, but rather denote the presence of at least one of the referenced items. In addition, unless otherwise denoted all directional signals such as up, down, left, right, inside, outside are taken relative to the illustration shown in FIG. 1.

The present invention describes a bell-hole pipeline protection system 10 that protects part of an underground pipeline 140 from being damaged from things such as heavy surface traffic. In addition, the pipeline protection system 10 enables access to the pipeline 140 and its instrumentation and also provides an indication of how much back-fill is required to cover the pipeline protection system 10. While the pipeline protection system 10 was originally conceived to protect pipelines 140 such as those used in the oil and gas industries the pipeline protection system 10 has broader applications and is useful for protecting virtually any underground piping, electrical passages ways, or instrumentation systems. It should be understood that the size of protected pipelines 140 and the other systems which the pipeline protection system 10 can protect may vary considerably.

Figure 2:
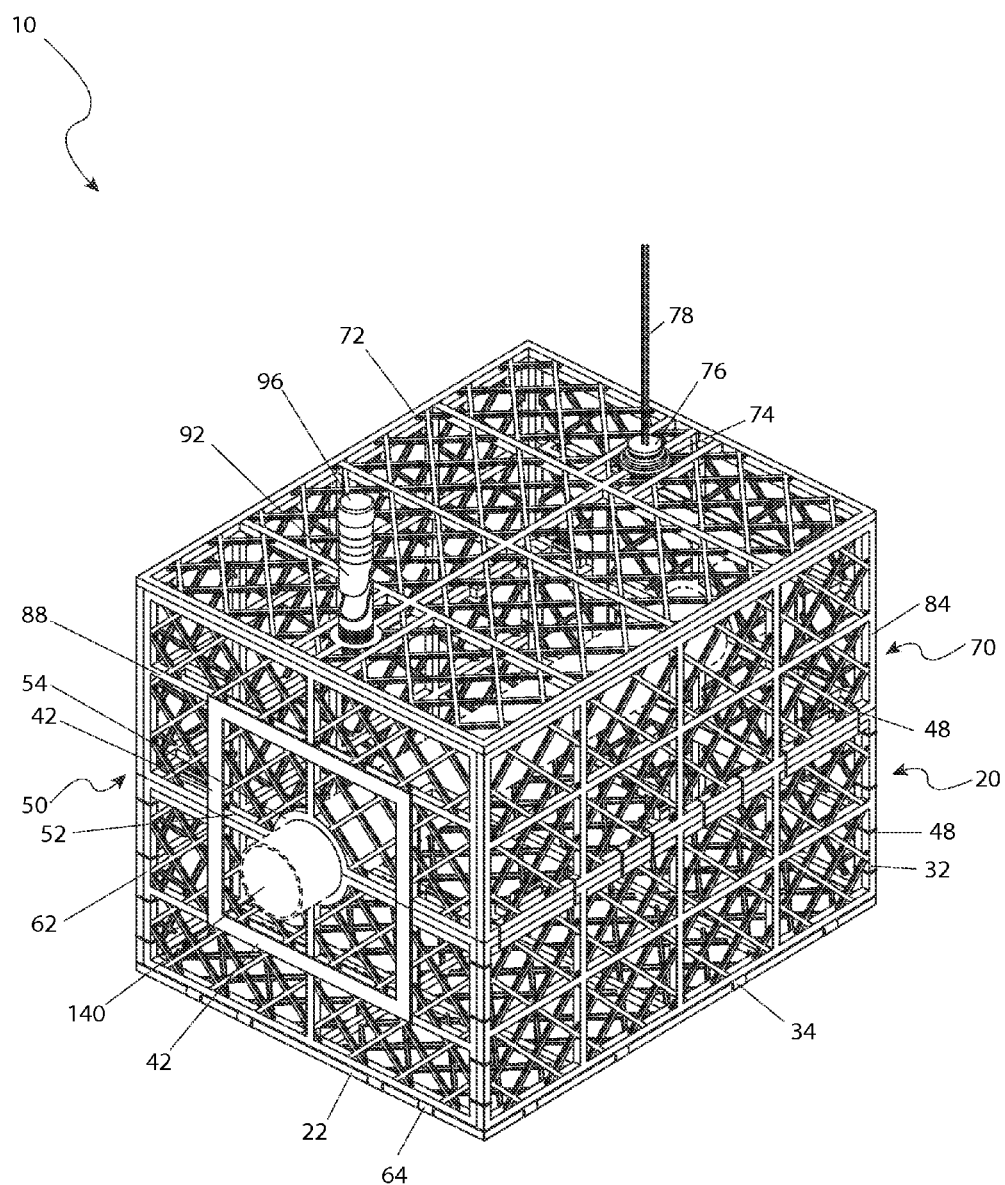
FIG. 2 is an isometric view of the pipeline protection system 10 shown in FIG. 1 but taken from another angle.
Figure 3:
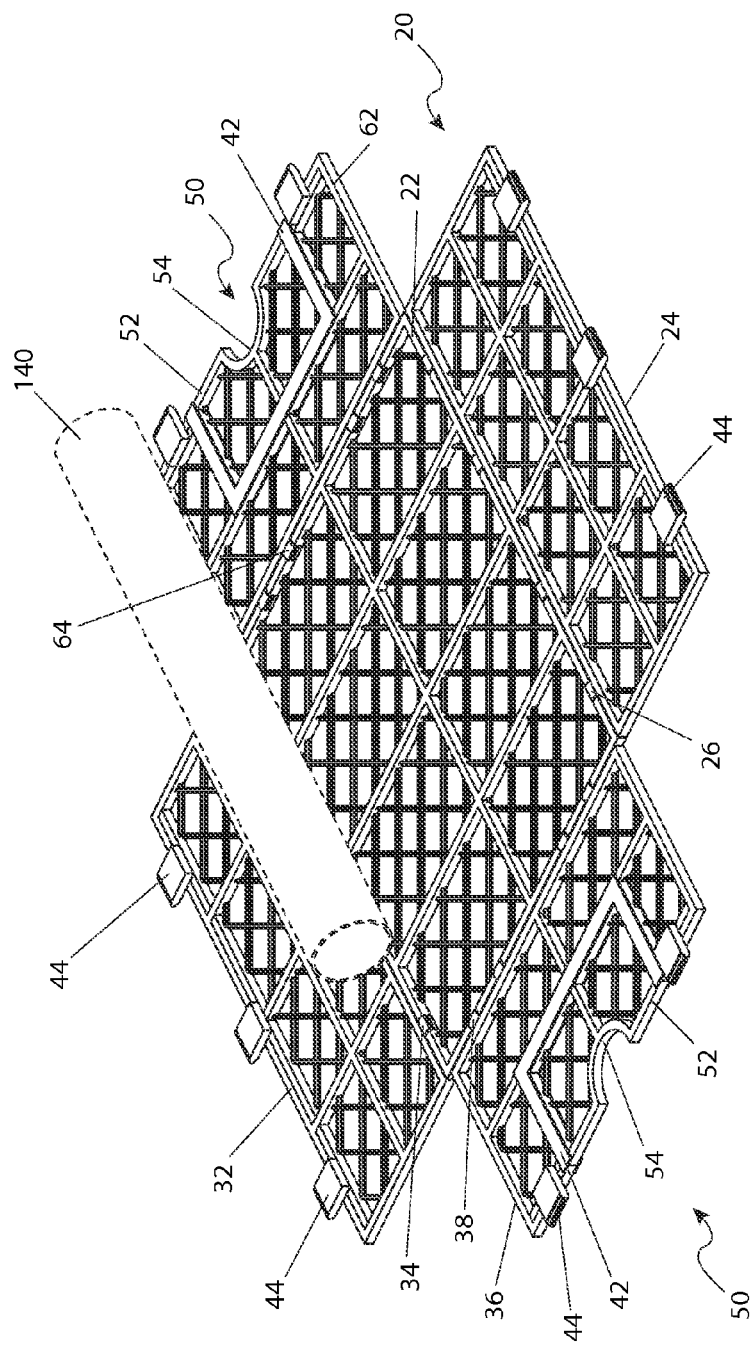
FIG. 3 illustrates an opened first frame 20 which is used in the pipeline protection system 10 shown in FIGS. 1 and 2.
Figure 5:
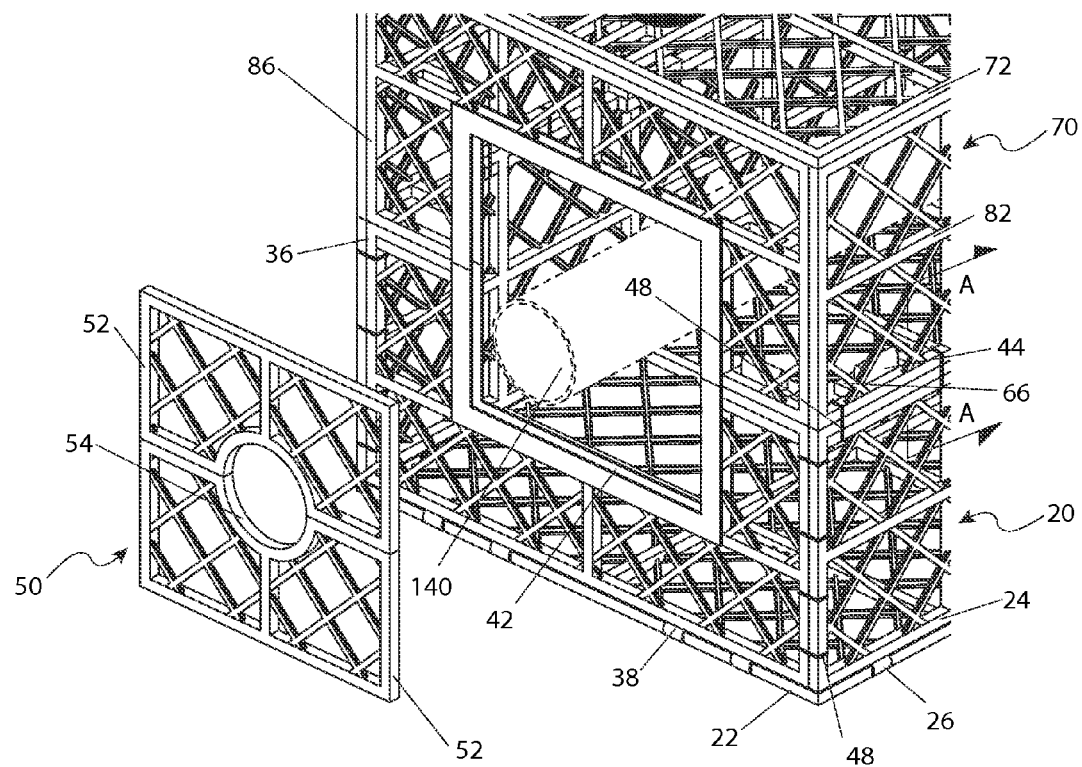
FIG. 5 illustrates how the insert 50 of FIG. 4 is used in the pipeline protection system 10 shown in FIGS. 1 and 2.

Referring now to FIGS. 1 and 2, isometric views of the pipeline protection system 10 taken from different angles; the pipeline protection system 10 includes a first frame 20 and a second frame 70. Turning briefly to FIGS. 3, 5, and 7, the first frame 20 and the second frame 70 are held in alignment when mated together by stakes 44 on the first frame 20 which insert into pockets 66 on the second frame 70. Turning back to FIGS. 1 and 2 the stakes 44 and pockets 66 are secured together by tie wraps 48 (also see FIGS. 5 and 8). The first frame 20 and the second frame 70 are preferably made of rigid thermoplastic and injection-molded to form a supportive enclosure around a pipeline 140 or other underground system. When installed the first frame 20 and the second frame 70 form a cage around the protected pipelines 140.

Turning now to FIG. 3, the first frame 20 includes a bottom panel 22, a first side panel 24, a second side panel 32, a first end panel 36, and a second end panel 62. Those panels are comprised of a structural framework of square cross-sectional elements interconnected and strengthen by a series of open lattice panels.

Figure 4:
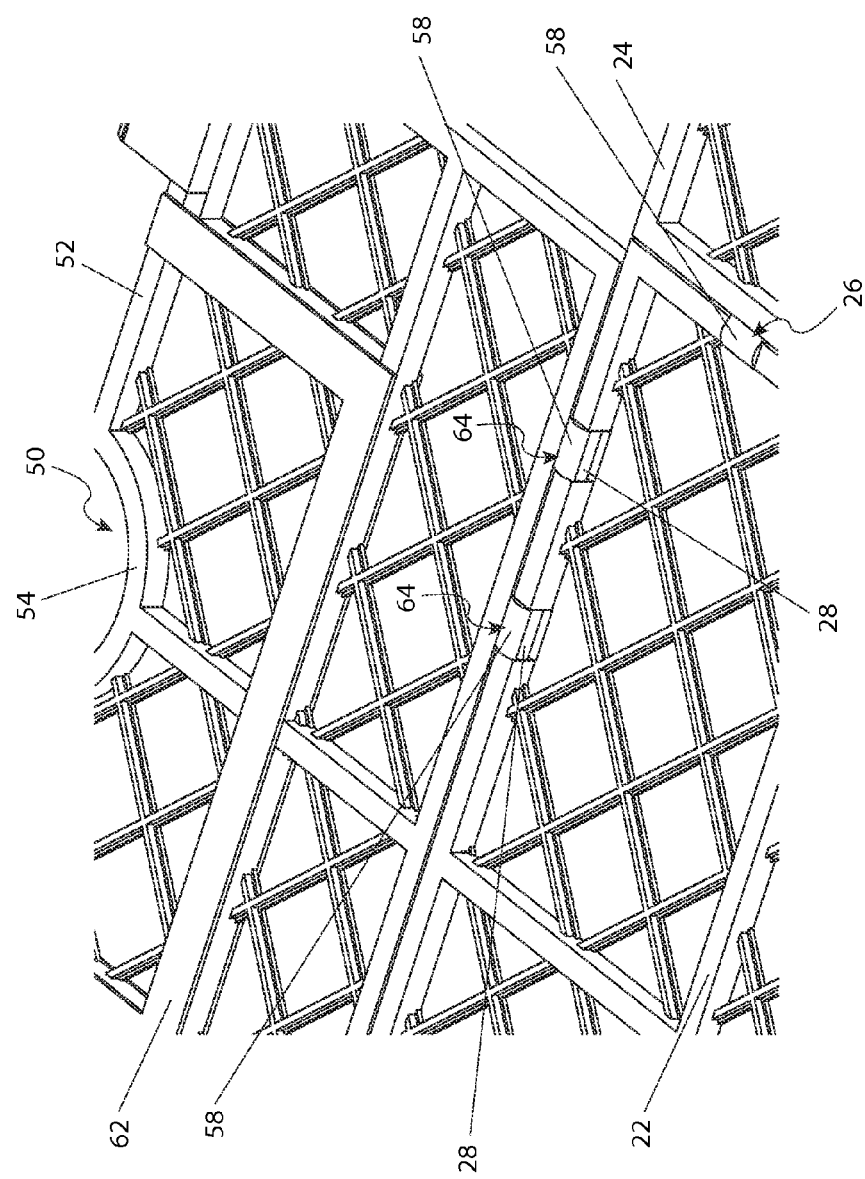
FIG. 4 is a detailed view of an insert 50 used in the pipeline protection system 10 shown in FIGS. 1 and 2.

Referring now to FIGS. 3 and 4, the bottom panel 22 includes cylindrical hinge pins 28 that pass through hinge knuckles 58 located on ends of the other panels 24, 32, 36 and 62. The hinge knuckles 58 are generally "C"-shaped and configured to partially encircle the hinge pins 28 and to freely rotate with respect to the hinge pins 28. While FIG. 4 only shows hinge knuckles 58 on the second end panel 62, thereby forming a second end hinge 64, and on the first side panel 24, thereby forming a first hinge 26 (see FIG. 5), it should be understood that the other panels also include hinge knuckles 58. FIG. 2 shows a second side hinge 34 formed by a hinge knuckle 58 on the second side panel 32 while FIG. 1 shows a first end hinge 38 formed by a hinge knuckle 58 on the first end panel 36 (see FIG. 5). Thus the first frame 20 has a bottom panel 22 with side panels and end panels that flip up and down.

Hinging the panels 24, 32, 36 and 62 to the bottom panel 22 enables the first frame 20 to be laid flat as illustrated in FIG. 3 or to be easily manipulated into place during installation of the pipeline protection system 10. This flexibility reduces the amount of material which needs to be removed from underneath the pipeline 140 during installation. After the bottom panel 22 is properly located under the pipeline 140 the various panels 24, 32, 36 and 62 are pivoted vertically and then secured in place using tie wraps 48 that are banded around the adjacent corner members; reference FIG. 5 for an illustration of using tie wraps 48 around the first frame 20 panels 24, 32, 36 and 62.

Referring now to FIGS. 3 and 5, the first end panel 36 and the second end panel 62 are configured with pipe inserts 50. A pipe insert 50 is a structural panel having a common insert frame 52 with half a pipe aperture 54 that is dimensioned to fit a specific diameter pipeline 140. Pipe inserts 50 can be selected from a series of pipe inserts 50 having different diameter pipe apertures 54. The pipe inserts 50 are inserted into insert slides 42 in the first end panel 36 and in the second end panel 62. This approach minimizes the variability which would otherwise be required in the end panels 36 and 62. The pipe inserts 50 align with pipe inserts 50 on the second frame 70 to surround the pipeline 140.

FIG. 7 shows a close up of the stakes 44 which were previously mentioned. The stakes 44 are disposed along ends of the first side panel 24, the second side panel 32, the first end panel 36, and the second end panel 62. While FIG. 7 specifically shows a stake 44 on the first side panel 24 it should be understood that the other panels also have stakes 44. Those stakes 44 mate with pockets 66 on the second frame 70 to align the second frame 70 with the first frame 20. The stakes 44 are preferably composed of the same material as the remainder of the pipeline protection system 10 and are best injection molded or attached by heat bonding.

The second frame 70 is very similar to the first frame 20 except it does not have hinged panels. The second frame 70 includes a third side panel 82 (see FIG. 5), a fourth side panel 84 (see FIG. 2), a third end panel 86 (see FIGS. 1 and 5), and a fourth end panel 88 (see FIG. 2) which are all attached directly to a top panel 72 (see FIGS. 5 and 8) and to their adjacent panels. The entire second frame 70 is preferably injection molded as a single piece or as pieces joined by heat bonding. As it is a unitary piece the second frame 70 has the ability to withstand certain moment loads.

Turning now to FIG. 6, disposed on the top panel 72 is a threaded collar 74 to which a stand pipe 92 is attached using a matching thread set. The collar 74 is preferably attached to the top panel 72 by heat bonding, but it may be attached by other means.

The stand pipe 92 is configured such that some of it is located above ground after the bell-hole trench has been backfilled. This enables access to the pipeline 140. Certain highly useful indicia 106, preferably consisting of circumferential lines and numerals indicating the depth from grade to the centerline of the pipeline 140, is disposed on the exterior of the stand pipe 92. Other indicia 106 may include, but not be limited to, the pipe size, the date of installation, and other data pertinent to the installation. The stand pipe 92 may also be colored to match a preferential coding system such as red for a gas pipeline and green for an oil pipeline or orange for a sewer line, etc.

The stand pipe 92 may contain instrumentation to monitor the condition of the pipeline 140. To that end, disposed at an upper end of the stand pipe 92 is a pipe cover 96 to close off the stand pipe 92 and prevent the ingress of water and debris which may damage the pipeline 140 or any enclosed instrumentation. The pipe cover 96 may be provided with a cover tab 98 which can be further provided with a tab aperture 102 and configured to be in proximity to a pipe tab 94 with a corresponding tab aperture 102. When so equipped and with the tab apertures 102 and the cover tab 98 in alignment a padlock may be installed to secure the pipe cover 96 in place.

As shown in FIGS. 1 and 2 (as well as FIG. 8) the top panel 72 is equipped with a second threaded collar 74 at an opposite end from the previously discussed collar 74. The second threaded collar 74 is attached in a similar manner. Inserted into this collar 74 preferably by an engaged matching thread set is a collar plug 76. The collar plug 76 is configured to retain a backfill gauge 78. The backfill gauge 78 has a number of small diameter rods made of a stiff thermoplastic material which project above the top panel 72 for some distance. The backfill gauge 78 is cut during installation of the pipeline protection system 10 to a length to which backfill material should be placed over the pipeline protection system 10 when closing the bell-hole trench. The collar plug 76 and the backfill gauge 78 may also be colored to match a preferential coding system so as to indicate the type of utility on which the pipeline protection system 10 is used.

In the third side panel 82, the fourth side panel 84, the third end panel 86, and the fourth end panel 88 are a plurality of pockets 66, reference FIG. 7. The pockets 66 are configured to align with the stakes 44 of the first frame 20. The pockets 66 are either attached to or molded with the panels 82-88 of the second frame 70.

The third end panel 86 and the fourth end panel 88 are constructed in a similar fashion as the first end panel 36 and the second end panel 62 to support pipe inserts 50 in insert slides 42. The pipe inserts 50 serve the same function as previously discussed and minimize the number of different embodiments of the system 50. The half pipe apertures 54 of adjacent pipe inserts 50 surround the pipeline 140.

An alternate embodiment pipeline protection system 10 is shown in FIG. 8. In that alternate embodiment a bottom panel 112 is used which incorporates two (2) threaded collars 74. That embodiment enables the pipeline protection system 10 to be assembled in reverse if so desired.

The preferred embodiment of the present invention can be utilized in a simple and straightforward manner with little or no training. After initial purchase or acquisition of the pipeline protection system 10 it would be installed as indicated in FIGS. 1 and 2. The method of installing and utilizing the pipeline protection system 10 may be achieved by performing the following steps: acquiring a model of the pipeline protection system 10 having the desired size of the pipe aperture 54 in the pipe inserts 50; installing the pipe inserts 50 into the insert slides 42; opening a bell-hole trench according to the prescribed method; making a pipeline 140 repair or installation as necessary, inserting the first frame 20 into the trench and under the pipeline 140, as seen in FIG. 3; rotating the panels 24, 32, 36 and 62 to a vertical orientation; installing tie wraps 48 on the adjacent corner members; installing the second frame 70 over the first frame 20; installing tie wraps 48 on the adjacent structural members; installing a stand pipe 92 of the correct length; installing a backfill gauge 78; trimming the backfill gauge 78 to the proper length to indicate the correct depth of backfill required for the pipeline protection system 10; routing any necessary instrumentation; inserting fill material into the pipeline protection system 10; backfilling the bell-hole trench to cover the backfill gauge 78 and installing the pipe cover 96.

The alternate embodiment of the present invention can be utilized by reversing the position of the second frame 70 and the first frame 20.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An underground service protection system, comprising:
   a first frame having a bottom panel, a first side panel attached to said bottom panel by a first hinge, a second side panel attached to said bottom panel by a second hinge, a first end panel attached to said bottom panel by a third hinge, and a second end panel attached to said bottom panel by a fourth hinge, wherein said first end panel includes a first set of insert slides and said second end panel includes a second set of insert slides;
   a second frame having a top panel, a third side panel, a fourth side panel, a third end panel, and a fourth end panel wherein said third end panel includes a third set of insert slides and said fourth end panel includes a fourth set of insert slides;
   a first insert having a first half aperture inserted into said first set of insert slides;
   a second insert having a second half aperture inserted into said second set of insert slides;
   a third insert having a third half aperture inserted into said third set of insert slides; and,
   a fourth insert having a fourth half aperture inserted into said fourth set of insert slides;
   wherein said first frame and said second frame are aligned such that said first half aperture and said third half aperture form a first aperture and said second half aperture and said fourth half aperture form a second aperture.

2. The underground service protection system of claim 1, further including a first collar attached to said top panel and a standpipe extending upward from said first collar.

3. The underground service protection system of claim 2, further including a pipe cover over said standpipe and a lock system for locking said pipe cover to said standpipe.

4. The underground service protection system of claim 2, wherein said standpipe extends above ground and includes indicia with information regarding the underground service protection system.

5. The underground service protection system of claim 2, wherein said standpipe extends above ground and is color coded to provide information regarding the underground service protection system.

6. The underground service protection system of claim 2, further including a second collar attached to said top panel and a backfill gauge extending upward from said second collar.

7. The underground service protection system of claim 6, wherein said backfill gauge indicates how much backfill material is needed to cover the underground service protection system.

8. The underground service protection system of claim 1, wherein said first aperture and said second aperture fit over a pipe.

9. The underground service protection system of claim 1, wherein said first hinge includes a hinge pin passing through said bottom panel.

10. The underground service protection system of claim 1, wherein said first frame includes stakes, wherein said second frame includes pockets, and wherein said stakes fit into said pockets when said first frame and said second frame are aligned.

11. The underground service protection system of claim 10, wherein said stakes and pockets are secured together by tie wraps.

12. The underground service protection system of claim 1, wherein said first side panel and said second side panel are secured together by tie wraps.

13. The underground service protection system of claim 1, wherein said first frame and said second frame form a protective cage around a pipe.

14. The underground service protection system of claim 1, wherein said first panel is comprised of a structural framework of square cross-sectional elements interconnected by a series of open lattice panels.

15. The underground service protection system of claim 1, wherein said second frame is a rigid structure.

16. The underground service protection system of claim 15, wherein said second frame is made using an injection molding process.

17. A protection system, comprising:
   a first frame having a bottom panel, a first side panel attached to said bottom panel by a first hinge, a second side panel attached to said bottom panel by a second hinge, a first end panel attached to said bottom panel by a third hinge, and a second end panel attached to said bottom panel by a fourth hinge, wherein said first end panel includes a first set of insert slides and said second end panel includes a second set of insert slides;
   a second frame having a top panel, a third side panel, a fourth side panel, a third end panel, and a fourth end panel wherein said third end panel includes a third set of insert slides and said fourth end panel includes a fourth set of insert slides;
   a first insert having a first half aperture inserted into said first set of insert slides;
   a second insert having a second half aperture inserted into said second set of insert slides;
   a third insert having a third half aperture inserted into said third set of insert slides; and,
   a fourth insert having a fourth half aperture inserted into said fourth set of insert slides;
   wherein said first frame and said second frame are aligned such that said first half aperture and said third half aperture form a first aperture and said second half aperture and said fourth half aperture form a second aperture;
   a first collar attached to said top panel;
   a second collar attached to said top panel;
   a third collar attached to said bottom panel; and,
   a fourth collar attached to said bottom panel.

18. The protection system of claim 17, further including a standpipe extending upward from said first collar and a pipe cover over said standpipe.

19. The protection system of claim 17, further including a backfill gauge extending from said second collar.

20. The protection system of claim 17, wherein said first frame includes stakes, wherein said second frame includes pockets, and wherein said stakes fit into said pockets when said first frame and said second frame are aligned.

* * * * *